United States Patent
Nham

(10) Patent No.: US 7,110,354 B2
(45) Date of Patent: Sep. 19, 2006

(54) METHOD OF CONTROLLING 1+1 BI-DIRECTIONAL SWITCHING OPERATION OF ASYNCHRONOUS TRANSFER MODE SWITCH

(75) Inventor: Ki-Moon Nham, Anyang-Shi (KR)

(73) Assignee: LG Electronics Inc., Seoul (KR)

( * ) Notice: Subject to any disclaimer, the term of this patent is extended or adjusted under 35 U.S.C. 154(b) by 894 days.

(21) Appl. No.: 10/025,994

(22) Filed: Dec. 26, 2001

(65) Prior Publication Data
US 2002/0080724 A1   Jun. 27, 2002

(30) Foreign Application Priority Data
Dec. 26, 2000   (KR) .............................. 2000-82032

(51) Int. Cl.
G01R 31/08   (2006.01)
G06F 11/00   (2006.01)

(52) U.S. Cl. ..................... 370/219; 370/227; 370/228

(58) Field of Classification Search ................... None
See application file for complete search history.

(56) References Cited

U.S. PATENT DOCUMENTS 5,159,638 A * 10/1992 Naito et al. ................. 704/213
5,263,017 A * 11/1993 Nakajima et al. ............ 370/228
5,479,608 A * 12/1995 Richardson .................... 714/4
5,831,970 A * 11/1998 Arao ........................... 370/227
6,226,111 B1 * 5/2001 Chang et al. .................. 398/9
6,317,426 B1 * 11/2001 Afanador et al. ............ 370/352
6,906,997 B1 * 6/2005 Rajan et al. .................. 370/216

* cited by examiner

Primary Examiner—Chau Nguyen
Assistant Examiner—Cynthia L. Davis
(74) Attorney, Agent, or Firm—Fleshner & Kim, LLP

(57) ABSTRACT

A system and method of controlling a bi-directional switching operation for a synchronous transfer mode (STM-1) signal transmission line of an asynchronous transfer mode (ATM) switch is disclosed. The system and method provide a rapid bi-directional switching operation through a 1+1 structure, being compatible with a 1+N structure, using MSP (Multiplex Section Protection) protocol. The process includes determining whether a signal fail has occurred, determining whether a priority of the signal fail is higher than that of a current signal fail determining whether a target station uses the same protocol as a source station if the priority of the signal fail is higher and performing a switching operation and transmitting a switching notification signal to the target station if the same protocol is used by the target station.

25 Claims, 4 Drawing Sheets

| K1[Mode] bits 7~4 | K1[CH] bits 3-0 | K2[CH] bits 7-4 | K2[S] bits 3 | K2[STS] bits 2~0 |
|---|---|---|---|---|
| request type | switching requested channel number | switching channel number | protection channel number | switching status |

FIG. 3

| channel value for request from working side to protection side (ATOB) | X10X |
|---|---|
| channel value for request from protection side to working side (BTOA) | X01X |
| channel value for working side in active mode (AWORK) | X00X |
| channel value for protection side in active mode (BWORK) | X11X |

METHOD OF CONTROLLING 1+1 BI-DIRECTIONAL SWITCHING OPERATION OF ASYNCHRONOUS TRANSFER MODE SWITCH

BACKGROUND OF THE INVENTION

1. Field of the Invention

The present invention relates to an Asynchronous Transfer Mode (ATM) switch, and more particularly to a method of controlling a bi-directional switching operation for a STM-1 (synchronous transfer mode-1) signal transfer line of an ATM switch.

2. Background of the Related Art

As well known to those skilled in the art, an ATM switch must be able to perform a protection switching operation using multiplex channels to overcome a fault at a STM-1 signal transfer line. The protection switching operation is performed through either a 1+1 or 1+N structure, and may be classified into an unidirectional mode and a bi-directional mode.

A STM-1 signal is transferred at 155.520 Mbps in a synchronous digital manner, and can be multiplexed from or demultiplexed into a plurality of E-1 signals.

In the 1+1 bi-directional switching operation, which is compatible with the 1+N bi-directional switching operation, a "K1" byte structure and "K2" byte structure are used in a Multiplex Section Overhead (MSOH) to perform a MSP switching operation. The MSP protocol is defined by ITU-T (International Telecommunication Union-Telecommunication Standardization Sector) Recommendation G.783, Annex A.

The "K1" and K2 byte structures are shown in FIG. 1. In the 1+N structure, channels "1" to "N" are working channels while a channel "0" is a protection channel. Similarly, in the 1+1 structure, a channel "1" is a working channel while a channel "0" is a protection channel.

A value "0" at a protection switching structure region of the K2 byte structure means a 1+1 structure, while "1" means a 1+N structure.

A value "111" at a switching status region of the K2 byte structure means an AIS (Alarm Indication signal) status and "110" means a RDI (Remote Detect Indication). A value "100" means the unidirectional mode and "101" means the bi-directional mode.

Further, a value "1111" at a request type region of the byte structures is defined as a "lockout", "1110" is a "forced switch", and "1101" is a "signal fail-high priority". Moreover, a value of "1000" is a "manual switch", "0010" is a "reverse request", "0001" is a "do not revert", and "0000" is a "no request".

There are additional values assigned and recommended by ITU-T in addition to the above described values, but they are not commonly used. Among the above given values, those with higher values have higher priorities.

In the 1+1 or 1+N structure, the 1 working channel or N working channels, where N can be up to 14, share the 1 protection channel. No signal can be transferred through the protection channel while being transferred through any of the working channels in a normal state.

FIG. 2 is a functional block diagram of a switching operation device with the 1+1 structure of an ATM switch. Referring to FIG. 2, when a working side 11 of a source station 10 and a working side 21 of a target station 20, or a protection side 12 of the source station 10 and a protection side 22 of the target station 20 are working in an active state, if a command such as a forced switch, manual switch, or the like is entered by an operator, or if a signal fail (SF) at the working sides 11 and 21, or a signal degrade (SD) at the working sides 11 and 21 or protection sides 12 and 22 occurs, then a bi-directional protection switching operation is generally performed using the "K1" and "K2" byte structures. The "K1" and "K2" byte structures have channel values as shown in FIG. 3.

A related art method of controlling a bi-directional protection switching operation of an ATM switch will be described hereinbelow with reference to FIGS. 1 to 4.

First, it is determined whether a control signal, such as a forced switch or manual switch by an operator, has been entered when the working sides 11 and 21 or protection sides 12 and 22 are working active, or whether a new event such as a SF (not at the protection sides 12 and 22), SD, or fault at a transfer line has occurred.

If it is determined that a new event has occurred or that a control signal has been entered by the operator, then the source station 10 detects the new event and compares a priority of the new event with that of a current event having already occurred and still being under way.

By comparison of their priorities, if the new event is determined to have higher priority, then the source station 10 transmits a request signal Req+ATOB or Req+BTOA including a request type and channel information, to a target station 20 (ST1).

Upon receiving the request signal Req+ATOB or Req+BTOA from the first station 10, the second station 20 checks the validity of the request signal. Thus, the target station 20 compares the priority of the operator's new request or new event with that of the current event. It then transmits a reverse request (RR) signal RR+BWORK or RR+AWORK with updated channel values of the "K2" byte structure to the source station 10, if the priority of the new event is higher than that of the current event (Step ST2). The RR signal indicates that the request of the source station 10 has been accepted by the target station 20.

Upon receiving the RR signal RR+BWORK or RR+AWORK from the target station 20, the source station 10 performs a switching operation from the working side 11 to the protection side 12 thereof When the switching operation has been completed, the source station 10 transmits a switching notification signal Req+BWORK or Req+AWORK to notify the target station 20 of the completion of the switching operation (Step ST3).

Upon receiving the switching notification signal, the second station 20 is notified that the first station 10 has performed the switching operation, and thus performs a switching operation from the working side 21 to the protection side 22 thereof. When the switching operation has been completed, the second station 20 transmits a switching notification signal RR+BWORK or RR+AWORK to the first station 10 (Step ST4).

By way of example, when a SF is detected when the working side 11 and the source station 10 is active, the working side 11 transmits a request signal SF+ATOB to the target station 20, as show in step ST1. The working side 21 in the target station 20 compares a priority of a new request or new event with that of a current event, and then transmits a RR signal RR+BWORK to the source station 10 if the priority of the new event is higher than that of the current one as shown in step ST2.

Upon receiving the RR signal, the source station 10 performs a switching operation from the working side 11 thereof to the protection side 12 thereof, and transmits a switching notification signal SF+BWORK to the target station 20 as shown in step ST3. The target station 20 then performs a switching operation from the working side 21 to the protection side 22 thereof, and notifies a result of the switching operation to the source station 10 as shown in step ST4.

The detection of the SF signal indicates that a critical fault at a corresponding channel or line has occurred at the 1+1 structure operating in the bi-directional mode. If this happens when the protection side is active, then the switching operation must be immediately performed to make the working side active.

The related art system and method thus has various problems. For example, if the SF signal is detected when the working side is active, then the switching operation is performed based on a protection switching scenario. This results in an abnormal state lasting for a period of time, albeit a short period of time. If, however, the abnormal state becomes worse, then it can cause a call termination.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a system and method of controlling a bi-directional switching operation in order to prevent a call termination.

It is another object of the present invention to provide a system and method of controlling a bi-directional switching operation by performing a switching operation of an ATM switch for processing a STM-1 signal using Multiplex Section Protection (MSP) protocol through a 1+1 structure being compatible with a 1+N structure in a minimum amount of time.

It is another object of the present invention to provide a system and method of processing a STM-1 signal of an ATM switch that minimizes faults such as a call termination to operate systems more reliably.

It is another object of the present invention to provide a system and method for controlling a bi-directional switching operation by performing a rapid bi-directional switching operation using MSP protocol upon detecting a SE (signal fail) at a working side in an active mode.

It is another object of the present invention to provide a method of controlling a 1+1 bi-directional switching operation of an ATM switch processing a STM-1 signal, to perform a rapid bi-directional switching operation in a minimum period of time through a 1+1 structure of the STM switch that is compatible with a 1+N structure, using a MSP (Multiplex Section Protection) protocol.

In order to achieve at least the above objects in whole or in parts, there is provided a method for controlling a 1+1 bi-directional switching operation of an ATM (Asynchronous Transfer Mode) switch, comprising a) by a source station, determining whether a new signal fail has occurred; b) by the source station, determining whether a priority of the new signal fail is higher than that of a current signal fail if the new signal fail is determined to have occurred at the step a); c) by the source station, determining whether a target station uses the same protocol if the priority of the new signal fail is determined to be higher at the step b); and d) by the source station, performing a switching operation if the same protocol is determined to be used by the target station at the step c), and transmitting a switching notification signal to the target station In order to further achieve at least the above objects in whole or in parts, there is provided a method for controlling a 1+1 bi-directional switching operation of an Asynchronous Transfer Mode (ATM) switch, comprising determining whether a new signal fail has occurred in a working side of a source station, the working side being in an active mode; determining whether a priority of the new signal fail is higher than that of a current signal fail if the new signal fail is determined to have occurred; determining whether a target station uses a same protocol as the source station if the priority of the new signal fail is determined to be higher than the current signal fail; determining whether a protection side of the source station is in a normal state if the target station is determined to be of a same system type based on the protocol; and performing a switching operation if the protection side of the source station is determined to be in its normal state, and transmitting a source switching notification signal to the target station.

In order to further achieve at least the above objects in whole or in parts, there is provided a method for controlling a 1+1 bi-directional switching operation of an Asynchronous Transfer Mode (ATM) switch, comprising detecting whether a signal fail has occurred in a protection side of a source station when the protection side is active; performing a switching operation from the protection side thereof to a working side of the source station, and transmitting a switching notification signal to a target station; and upon receiving the switching notification signal at the target station, transmitting a switching notification signal from the target station to the source station and performing a switching operation from a protection side of the target station to a working side thereof.

In order to further achieve at least the above objects in whole or in parts, there is provided an asynchronous transfer mode (ATM) switch, comprising a first station, having a first working side and a first protection side; and a second station, having a second working side and a second protection side, the first and second working sides coupled by a working channel and the first and second protection sides coupled by a protection channel, wherein the first station is configured to determine whether a current signal fail has occurred at the first station, determine whether the second station uses a same protocol as the first station, and perform a switching operation if the protocol is determined to be the same.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a diagram illustrating exemplary values of the channels of the "K1" and "K2" byte structures;

DETAILED DESCRIPTION OF PREFERRED EMBODIMENTS

The preferred embodiment of the present invention provides a system and method of controlling a switching operation of an ATM switch processing high-speed data, for example, 155.520 Mbps. This allows for a rapid switching operation from a data transfer channel path or line of the ATM switch to a protection path in a standby mode when a fault at the channel path or line occurs.

The ATM switch preferably has two path switching modes. The first is a bi-directional mode, in which a source station 10 and target station 20 perform switching of a transmitter and receiver device, respectively, to use the same side of the devices. The second is a bi-directional mode, in which the target station 20 does not perform switching of the receiver device even if the source station 10 performs switching of the transmitter device. The ATM switch of the preferred embodiment is preferably applied to the bi-directional mode.

In the bi-directional mode, both a transmitter and a receiver device have to be switched to the same side of data transfer channel paths. A SF (signal fail) may be a LOS (loss of signal), a LOF (loss of frame), or an AIS (alarm indication signal) caused by a separation of or a fault in a device, such as a circuit board, or a fault in a line of a hardware device for transmitting and receiving data of the ATM switch or transfer equipment.

A SD (signal degrade) occurs when the signal level is not appropriate for a predetermined threshold value. Upon occurrence of the SD, a data-grade signal must be switched for transfer, while a voice-grade signal may be transferred directly.

A description of an example of a method of controlling a 1+1 bi-directional switching operation of an ATM switch in accordance with the preferred embodiment of the present invention will be given hereinafter with reference to FIGS. 1 to 3 and 5. It is noted that a 1+1 structure of the ATM switch is the same as that shown in FIG. 2 and is described in detail in the related art, and therefore its functional explanation is omitted here.

A path switching function of the ATM switch is duplexed into an active and standby mode of the 1+1 structure, and is classified into a function of switching by an external control command from an operator, and a function of determining and switching by the ATM switch itself, referred to as an automatic protection switching (APS) function.

The APS function is preferably performed when the working sides 11 and 21 of the source station 10 and target station 20, respectively, are active and a SF or SD occurs in those sides. The APS function may also be performed when the protection sides 12 and 22 of the source station 10 and target station 20, respectively, are active and a SF or SD occurs in those sides.

Figures 1, 2:
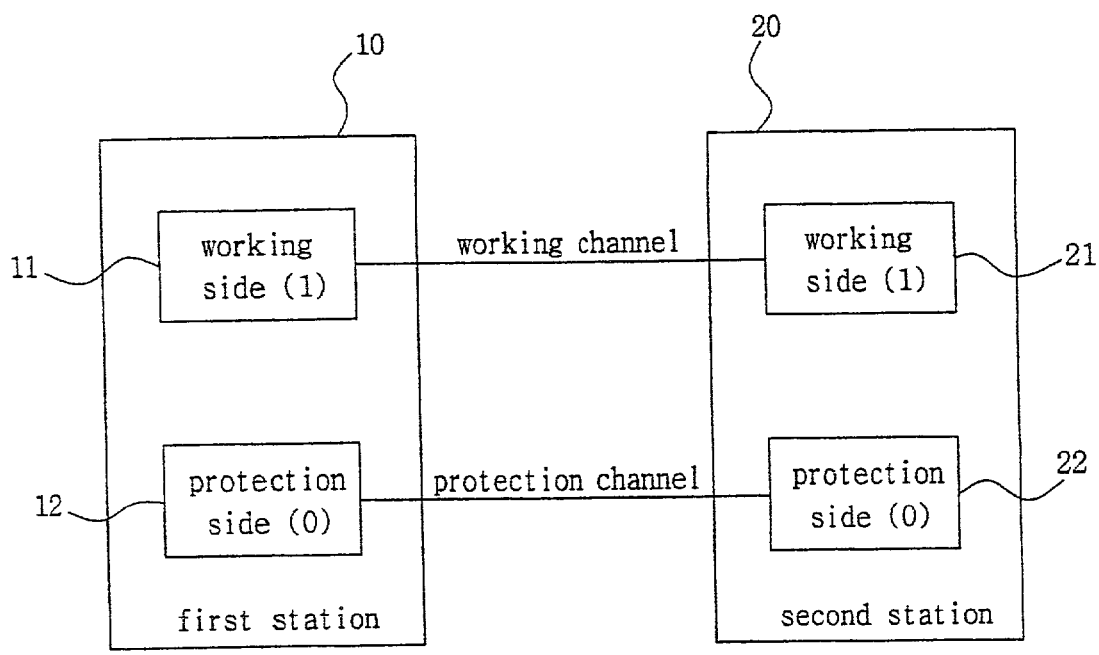
FIG. 1 illustrates a "K1" byte structure and "K2" byte structure of a Multiplex Section Overhead (MSOH)
FIG. 2 is a block diagram illustrating a 1+1 bi-directional switching operation of an ATM switch.
Figure 4:
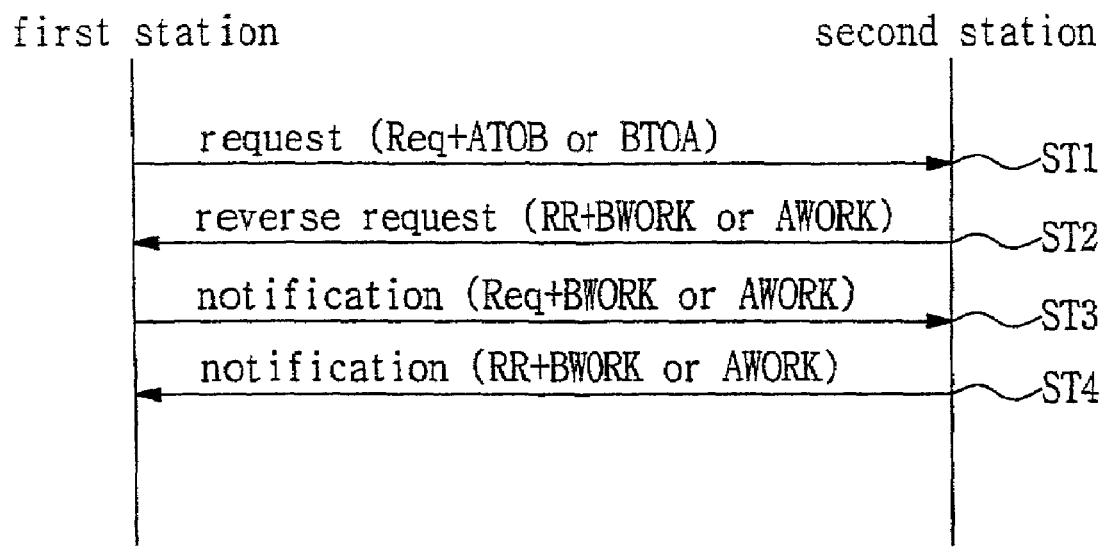
FIG. 4 is a flow chart illustrating a related art method of controlling a bi-directional protection switching operation.
Figure 5:
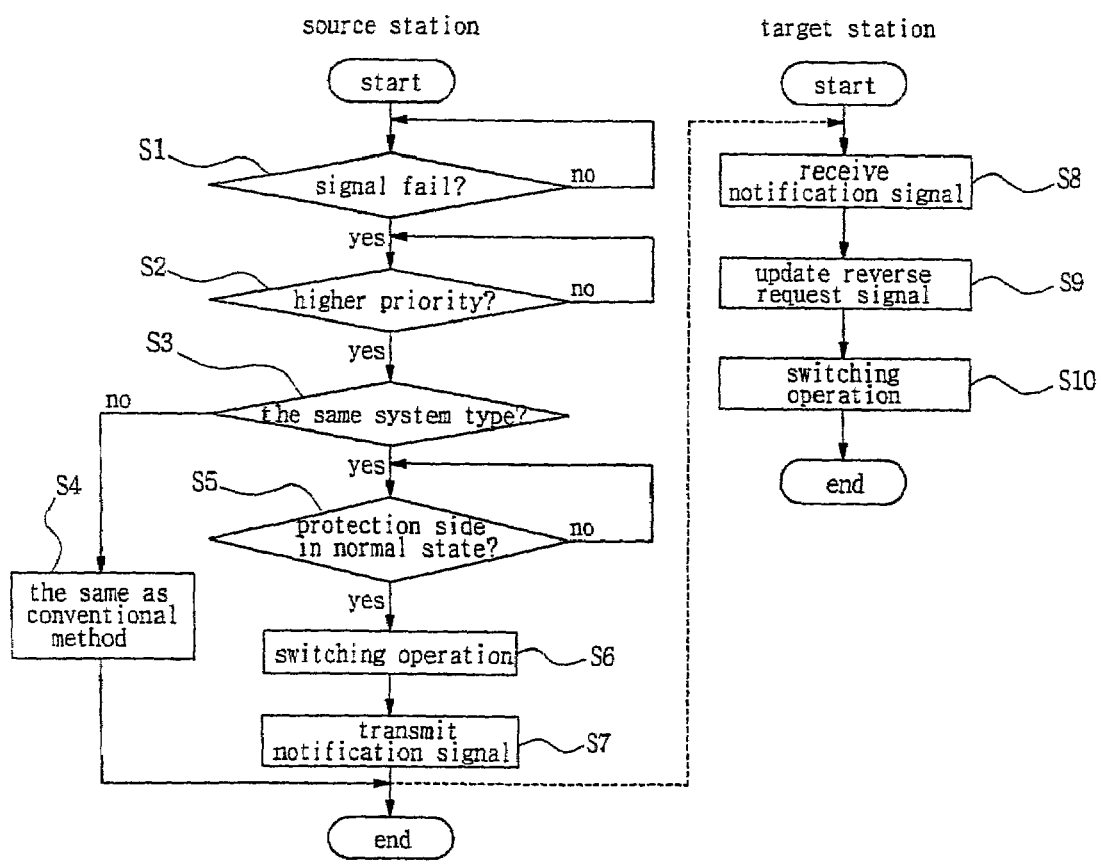
FIG. 5 is a flow chart illustrating a method of a bi-directional protection switching operation in accordance with a preferred embodiment of the present invention.

Referring to FIG. 5, the source station 10 preferably has a duplex structure of the working side 11 and protection side 12. The target station 20 similarly has a duplex structure of the working side 21 and protection side 22. According to the duplex structure, either side can be active, but in the bi-directional switching mode, communications therebetween must be established on the same side.

In the bi-directional mode, the working side 21 of the target station 20 preferably becomes active when the working side 11 of the source station 10 becomes active, and the protection side 22 of the target station 20 becomes active when the protection side 12 of the source station 10 becomes active. Further, in the bi-directional mode, it is determined whether a new SF is detected in the working sides 11 and 21 of the source station 10 and target station 20 when they are working active (Step S1).

If it is determined that a new SF is detected in the working sides 11 and 21 in an active mode, the source station 10 determines whether a priority of the newly detected SF is higher than that of a previously detected SF (step S2).

If the priority of the new SF is determined to be higher than a previous SF, then the source station 10 determines whether the target station 20 is of the same system type. That is, the source station 10 determines whether the target station 20 employs the same protocol (Step S3).

In the above determination, the source station 10 assigns an identifier function to unused bits of the "K1" byte structure. The resulting K1 byte is transmitted to the target station 20 such that the target station 20 recognizes the "K1" byte structure if the target station 20 uses the same protocol.

If the target station 20 recognizes the "K1" byte structure, then the target station 20 transmits a corresponding reverse request signal to the source station 10. The source station 10 thus recognizes that the target station 20 is of the same system type employing the same protocol.

If it is determined that the target station is of the same system type, the source station 10 determines whether the protection side 12 thereof in a standby mode is maintained in its normal state (Step S5).

If the protection side 12 is determined to be in its normal state, the source station 10 preferably performs a switching operation from the working side 11 thereof, in which the SF has occurred, to the protection side 12 thereof, which is in its normal state (Step S6). The source station 10 then transmits a switching notification signal SF+BWORK, which notifies the target station 20 of the completion of the switching operation (Step S7).

The target station 20 receives the notification signal (Step S8), and updates a reverse request signal RR+BWORK (Step S9). The updated signal is transmitted to the source station 10 and the target station 20 performs a switching operation from the working side 21 thereof to the protection side 22 thereof (Step S10).

As a result, the protection sides 12 and 22 of the source station 10 and target station 20, respectively, become active and the working sides 11 and 21 enter into a standby mode.

On the other hand, if the target station 20 and source station 10 are determined not be of the same system type, and not employing the same protocol, then the switching operation in accordance with the preferred embodiment cannot be performed, and the bi-directional switching operation in accordance with the related art method is preferably performed (Step S4).

The switching operation of the preferred embodiment is processed with a higher priority when the protection side 12 of the source station 10 is active than when the working side 11 thereof is active. That is, if a SF is detected when the protection side 12 of the source station 10 is active, then it is processed first with a higher priority than other SFs, and switching steps S1 to S10 advance in the same manner.

The method of the present invention may be applied to all kinds of ATM switches transferring STM-1 signals, and more particularly to model name SMOT-n transfer equipment. It should also be understood that the above described concepts could be applied to analogous systems of different standouts, such as OC-3 and T-1 standards.

Additionally, the method of the preferred embodiment may be applied through an adaptation of softwares, and may be implemented to host processors and hardwares without limitation.

The preferred embodiment of the present invention has many advantages. For example, it reduces the occurrence of faults, such as a call termination, by minimizing the period of time for switching the channel path or line in response to occurrence of a fault in a data transfer path of an ATM switch processing a high-speed STM-1 signal.

Further, the preferred embodiment improves a reliability of an ATM switch by reducing the number of steps of a switching operation compared to that of the related art method, to perform a rapid switching operation.

The foregoing embodiments and advantages are merely exemplary and are not to be construed as limiting the present invention The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a 1+1 bi-directional switching operation of an Asynchronous Transfer Mode (ATM) switch, comprising:
   determining whether a signal fail (SF) has occurred at a source station;
   determining whether a priority of the SF is higher than a priority of an existing SF if the SF is determined to have occurred;
   determining whether a target station uses a same protocol as the source station if the priority of the SF is determined to be higher than the priority of the existing SF;
   performing a switching operation if the same protocol is determined to be used by the target station, and transmitting a switching notification signal from the source station to the target station; and
   performing associated switching operations by the target and source stations after checking signals from each other, if it is determined that the target station does not use the same protocol as the source station,
   wherein priority is higher when a protection side of the source station is active, than when a working side of the source station is active.

2. The method of claim 1, wherein the switching operation is performed by the source station.

3. The method of claim 2, wherein the target station performs the switching operation upon receiving the switching notification signal from the source station.

4. The method of claim 1, further comprising:
   upon receiving the switching notification signal transmitted from the source station to the target station, transmitting a second switching notification signal from the target station to the source station, and switching from a working side of the target station to a protection side thereof, the protection side being in a standby mode.

5. The method of claim 1, wherein determining whether the target station uses the same protocol as the source station comprises:
   defining a "K1" byte at the source station, the "K1" byte being unused, and transmitting the resulting "K1" byte from the source station to the target station; and determining that the target station is of the same protocol if the target station responds to the transmitted "K1" byte.

6. The method of claim 1, wherein performing associated switching operations comprises:
   transmitting a switching request signal from the source station to the target station upon detection of the SF;
   transmitting a reverse request signal to the source station from the target station in response to the switching request signal;
   performing the associated switching operation by the source station upon receiving the reverse request signal and transmitting a source switching notification signal to the target station; and
   upon receiving the switching notification signal at the target station, performing the associated switching operation in a manner identical to the source station, and transmitting a target switching notification signal to the source station.

7. The method of claim 1, wherein the SF is at least one of a Loss of Signal (LOS) condition, a Loss of Frame (LOF) condition, and an Alarm Indication Signal (AIS).

8. The method of claim 7, wherein the AIS occurs by at least one of a separation of a circuit board, a fault in a circuit board, and a fault in a line of a transmitting or receiving device.

9. The method of claim 1, wherein if a signal degrade (SD) status is detected at the source station having a higher priority then an existing SD status, the switching operation is performed if a data-grade signal is being transferred.

10. A method for controlling a 1+1 bi-directional switching operation of an Asynchronous Transfer Mode (ATM) switch, comprising:
    determining whether a new signal fail (SF) has occurred in a working side of a source station, the working side being in an active mode;
    determining whether a priority of the new SF is higher than a priority of a current SF if the new SF is determined to have occurred;
    determining whether a target station uses a same protocol as the source station if the priority of the new SF is determined to be higher than the priority of the current SF;
    determining whether a protection side of the source station is in a normal state after the target station is determined to be of a same system type as the source station based on the protocol;
    performing a switching operation if the protection side of the source station is determined to be in its normal state, and transmitting a source switching notification signal to the target station; and
    performing associated switching operations by the target and source stations after checking signals from each other, if it is determined that the target station does not use the same protocol as the source station,
    wherein a priority when the protection side is active is higher than a priority when the working side is active.

11. The method of claim 10, further comprising:
    receiving the source switching notification signal transmitted by the source station at the target station; and
    transmitting a target switching notification signal from the target station to the source station and performing the switching operation from a working side of the target station to a protection side thereof, the protection side being in a standby mode.

12. The method of claim 10, wherein determining whether the target station uses the same protocol comprises:

defining a "K1" byte at the source station, the "1" byte being unused, and transmitting the resulting "K1" byte to the target station; and determining that the target station is of the same system type if the target station responds to the transmitted "K1" byte signal within a prescribed period of time.

13. The method of claim 10, wherein performing associated switching operations comprises:

transmitting a switching request signal from the source station to the target station upon detection of the new SF;

transmitting a reverse request signal from the target station to the source station in response to the switching request signal;

upon receiving the reverse request signal at the source station, performing the associated switching operation and transmitting a source switching notification signal to the target station; and upon receiving the source switching notification signal at the target station, performing the associated switching operation in a same manner as the source station, and transmitting a target switching notification signal to the source station.

14. The method of claim 10, wherein the new SF is at least one of a Loss of Signal (LOS) condition, a Loss of Frame (LOF) condition, and an Alarm Indication Signal (AIS).

15. The method of claim 14, wherein the AIS occurs by at least one of a separation of a circuit board, a fault in a circuit board, and a fault in a line of a transmitting or receiving device.

16. A method for controlling a 1+1 bi-directional switching operation of an Asynchronous Transfer Mode (ATM) switch, comprising:

detecting whether a signal fail (SF) has occurred in a protection side of a source station when the protection side is active;

determining whether a protocol of a target station matches a protocol of the source station:

determining whether a priority of the SF is higher than a priority of an existing SF;

performing a switching operation from the protection side thereof to a working side of the source station after determining whether a signal fail has occurred and after determining that a protocol of the target station matches a protocol of the source station and that the priority of the SF is higher than the priority of the existing SF, and transmitting a switching notification signal to the target station;

upon receiving the switching notification signal at the target station, transmitting a switching notification signal from the target station to the source station and performing a switching operation from a protection side of the target station to a working side thereof; and performing associated switching operations by the target and source stations after checking signals from each other, if it is determined that the target station does not use the same protocol as the source station, wherein a priority when the protection side is active is higher than a priority when the working side is active.

17. The method of claim 16, wherein the determining whether a protocol of the target station matches a protocol of the source station comprises defining a "K1" byte at the source station, the "K1" byte being unused, and transmitting the resulting "K1" byte to the target station; and determining that the target station is of the same system type if the target station responds to the transmitted "K1" byte signal within a prescribed period of time.

18. An asynchronous transfer mode (ATM) switch, comprising:

a first station, having a first working side and a first protection side; and a second station, having a second working side and a second protection side, the first and second working sides being coupled by a working channel and the first and second protection sides being coupled by a protection channel, wherein the first station is configured to determine whether a signal fail has occurred at the first station, determine whether the second station uses a same protocol as the first station, and perform a switching operation if the protocol is determined to be the same, wherein the first station determines whether a priority of the signal fail is higher than a priority of an existing signal fail when a signal fail is detected while the existing signal fail is present, wherein the first station and the second station perform associated switching operations after checking signals from each other, if it is determined that the second station does not use the same protocol as the first station, and wherein the priority is determined to be higher when the first protection side is active than when the first working side is active.

19. The system of claim 18, wherein the switching operation comprises switching from the first working side to the first protection side and transmitting a switching notification signal to the second station.

20. The system of claim 19, wherein the second station transmits a second switching notification signal to the first station upon receiving the switching notification signal from the first station, and wherein the second station performs a switching operation from the second working side to the second protection side.

21. The system of claim 18, wherein the first station switches from the first working side to the first protection side if the signal fail has occurred in the first working side.

22. The system of claim 18, wherein the first station determines whether the second station uses the same protocol by defining an unused "K1" byte and transmitting it to the second station, and determining that the second station is of the same system type if the second system responds to the transmitted "K1" byte within a prescribed period of time.

23. The system of claim 18, wherein the signal fail comprises at least one of a Loss of Signal (LOS) condition, a Loss of Frame (LOS) condition, and an Alarm Indication Signal (AIS).

24. The system of claim 23, wherein the AIS occurs by at least one of a separation of a circuit board, a fault in a circuit board, and a fault in a line of a transmitting or receiving device.

25. The system of claim 18, wherein the ATM switch is configured to provide a 1+1 bi-directional switching operation.

* * * * *